Figure 1:
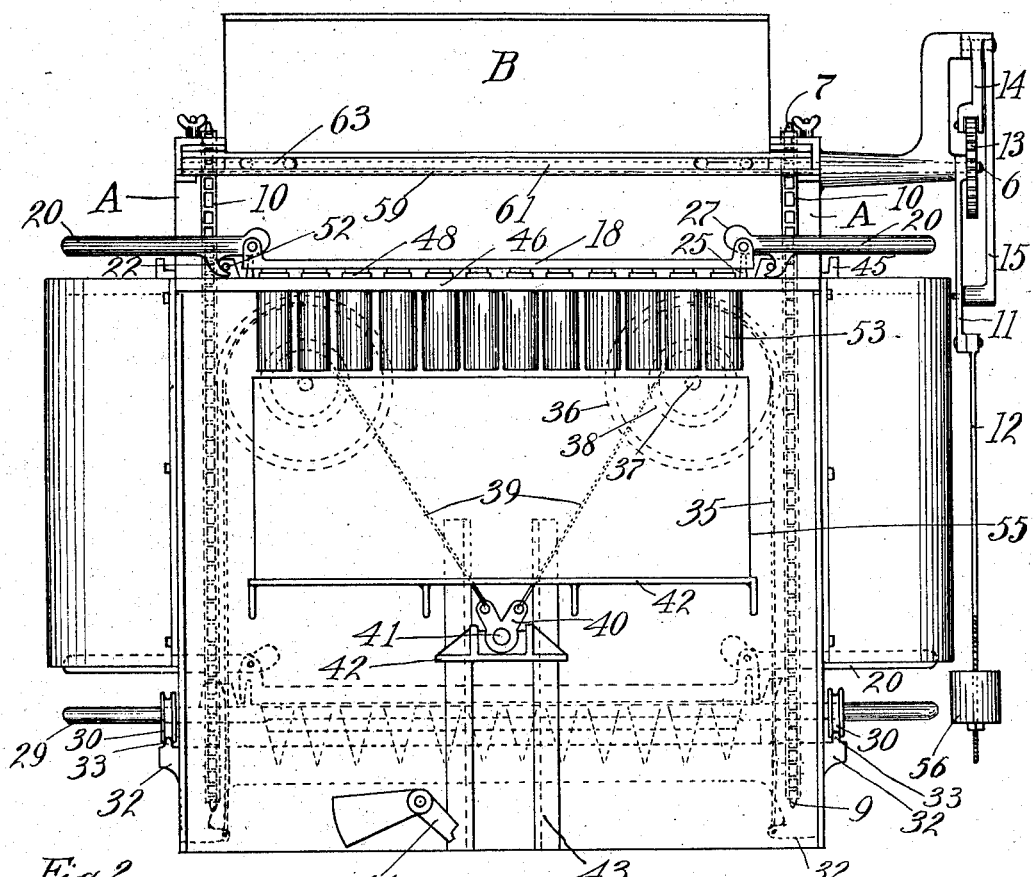

S. F. PIERCE.
APPARATUS FOR MAKING PASTRY CORNETS.
APPLICATION FILED MAR. 1, 1909.

1,012,274.

Patented Dec. 19, 1911.
5 SHEETS—SHEET 1.

Witnesses,
George Voelker
Hattie Smith

Inventor,
Simon F. Pierce
by Bothroff & Johnson
his Attorneys

S. F. PIERCE.
APPARATUS FOR MAKING PASTRY CORNETS.
APPLICATION FILED MAR. 1, 1909.

1,012,274.

Patented Dec. 19, 1911.

Witnesses,
George Voelker
Hattie Smith

Inventor,
Simeon F. Pierce
by Lothrop & Johnson
his Attorneys

S. F. PIERCE.
APPARATUS FOR MAKING PASTRY CORNETS.
APPLICATION FILED MAR. 1, 1909.
1,012,274.
Patented Dec. 19, 1911.
5 SHEETS—SHEET 3.
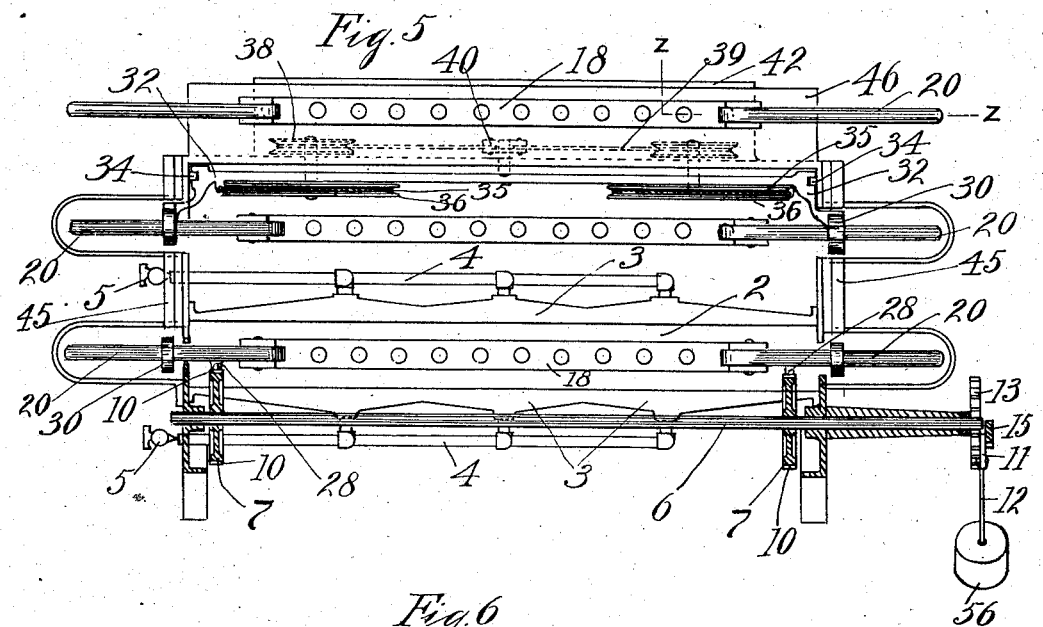
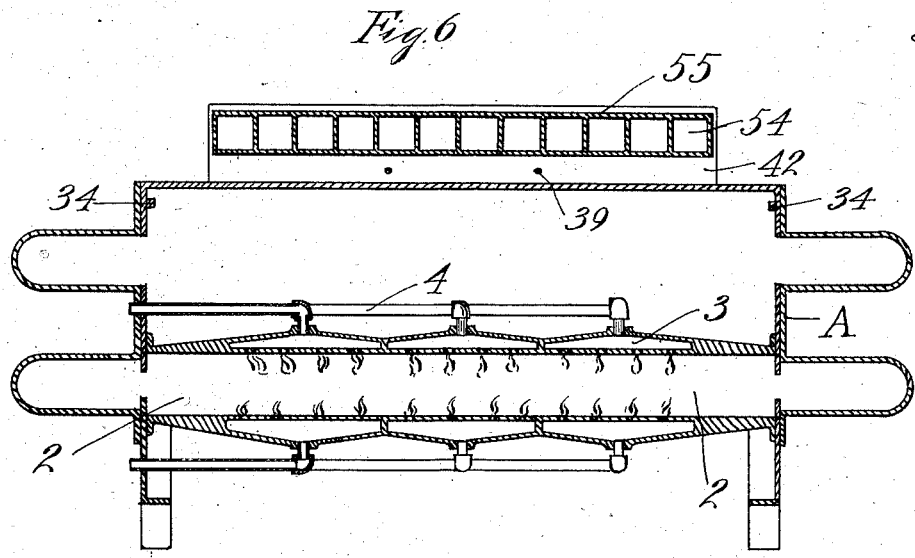
Witnesses,
George Voelker
Hattie Smith
Inventor,
Simeon F. Pierce
by Lothrop & Johnson
his Attorneys.

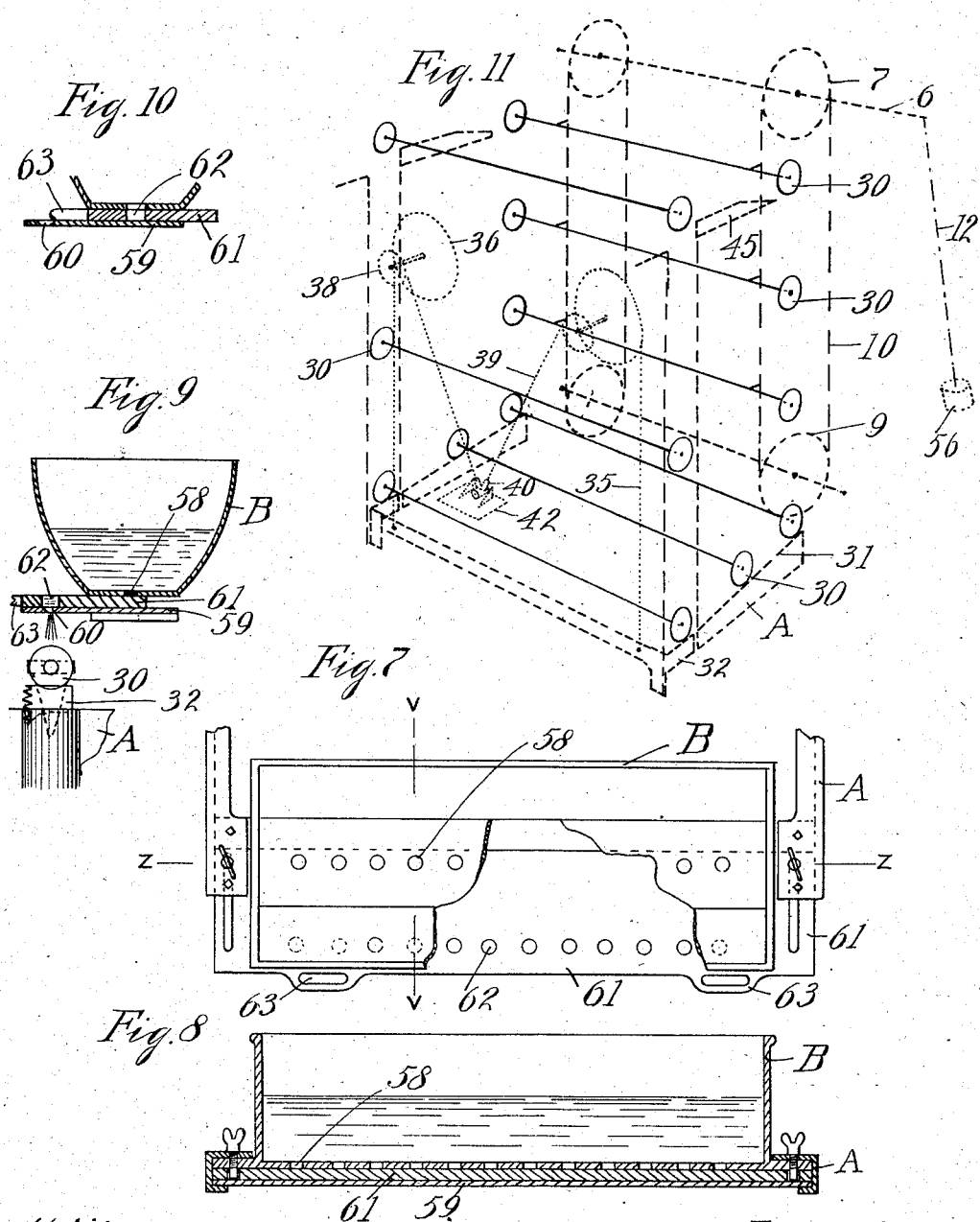

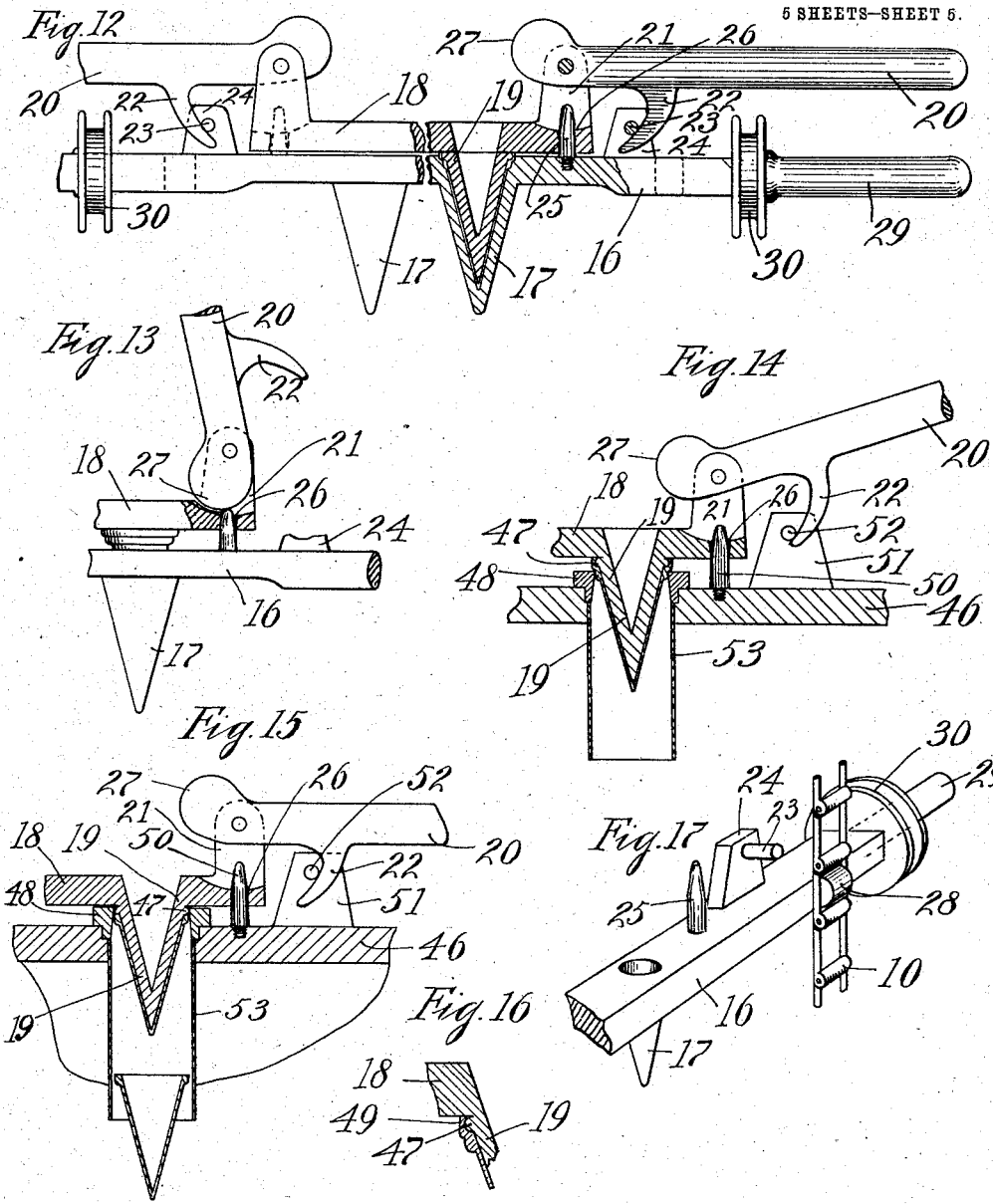

UNITED STATES PATENT OFFICE.

SIMEON F. PIERCE, OF ST. PAUL, MINNESOTA, ASSIGNOR TO CREAM CONE MACHINE COMPANY, OF ST. PAUL, MINNESOTA, A CORPORATION OF MINNESOTA.

APPARATUS FOR MAKING PASTRY CORNETS.

1,012,274.     Specification of Letters Patent.     Patented Dec. 19, 1911.

Application filed March 1, 1909. Serial No. 480,549.

*To all whom it may concern:*

Be it known that I, SIMEON F. PIERCE, a citizen of the United States, residing at St. Paul, in the county of Ramsey and State of Minnesota, have invented certain new and useful Improvements in Apparatus for Making Pastry Cornets, of which the following is a specification.

My invention relates to improvements in machines for baking pastry cornets, such as those used to hold ice cream and the like, its object being to insure uniformity in baking, and ease in handling, the cornets so that a large number can be baked and handled at once.

Where it has been attempted to bake and handle a large number of cornets at the same time, and to put them all in a group through the various processes and steps required, difficulty has been found in applying the heat so as to bake the cornets uniformly and sufficiently, and also in detaching the baked cornets from the molds. With the ordinary molds, which are made in co-operating sections, there is no certainty as to which section of the mold the baked cornet will adhere to. It often happens that some of the cornets adhere to one of the mold sections, while the other cornets adhere to the other mold section. In such case the operator often has not time to remove all of the cornets before the mold sections pass on to be refilled with dough.

To overcome these difficulties, and to facilitate the handling of the cornets, I have devised the machine herein shown and described, wherein a large number of cornets or other molded forms of pastry can be baked at the same time. In the machine I have provided certain novel means for applying the heat to the cornets, so that the cornets shall be exposed to the heat a uniform and predetermined length of time so as to insure uniformity of baking. I have also provided certain novel means for causing all of the baked cornets to adhere to the same, or rather to the corresponding, mold sections, and for detaching the cornets therefrom. I have also provided novel means for locking the mold bars together, for nesting the baked cornets, and for the other purposes mentioned in the specification.

More particularly the invention consists in the construction, combination and arrangement of parts hereinafter described and claimed.

Figure 2:
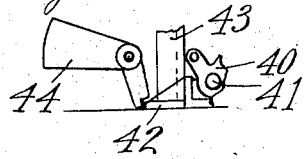

In the accompanying drawings, forming part of this specification, Figure 1 is a front elevation of my improved machine; Fig. 2 is a detail of the latch for the sliding tread plate for lifting the baked cornets; Fig. 3 is a side view of the machine; Fig. 4 is a perspective detail of the stop mechanism for the mold bars; Fig. 5 is a horizontal section of the machine on line $x$—$x$ of Fig. 3; Fig. 6 is a horizontal section on line $y$—$y$ of Fig. 3; Fig. 7 is a top view of the dough tank, partly broken away, and of the sliding valve plate; Fig. 8 is a vertical section of the dough tank on line $z$—$z$ of Fig. 7; Fig. 9 is a cross section of the dough tank on line $v$—$v$ of Fig. 7; Fig. 10 is a detail in section of the sliding plate and the bottom of the dough tank; Fig. 11 is a diagrammatic view to illustrate the operation of the machine; Fig. 12 is a view partly in section and partly in front elevation of a fragment of the mold bars and molds; Fig. 13 is a detail showing the method of separating the mold sections; Fig. 14 is a detail in section on line $z$—$z$ of Fig. 5, showing the method of cutting the cornet loose from the inner mold; Fig. 15 is a similar view showing the parts at the end of the cutting operation; Fig. 16 is a detail showing the means for causing the cornet to adhere to the inner mold; and Fig. 17 is a detail in perspective of one of the ends of a mold bar in engagement with the sprocket chain.

In the drawings A represents the frame of the machine. In this is supported a vertically extending elongated stove or oven 2 open at top and bottom, of sufficient length to accommodate the mold bars hereinafter described. On each side of the oven are a number of separated burners 3, to each of which gas is supplied through a pipe 4. The side walls of the oven are perforated to permit gas to enter the oven. Each pipe is supplied with a separate valve 5 so that as many or as few burners may be used as will produce the requisite amount of heat.

Journaled in the upper ends of the frame above the oven is a shaft 6, carrying at each end a sprocket wheel 7. Also journaled in the frame below the lower end of the oven is a shaft 8 carrying a pair of sprocket wheels 9, alining with the corresponding upper sprocket wheels 7. The sprocket wheels are operatively connected by means of a chain 10 which passes over the wheels and down through the oven. These chains constitute carriers or elevators upon which the mold bars ride as they are lowered down through the oven, as hereinafter described.

In order to secure uniformity of baking, it is important that the cornets should be exposed evenly to the heat of the oven for a predetermined length of time,—in other words, that their passage down through the oven should be retarded and controlled by time element mechanism. This I accomplish by means of an escapement controlled pendulum. Secured to the projecting end of the shaft 7 is an arm 11 to the lower end of which is pivoted a weighted pendulum rod 12. The speed of the pendulum can be regulated by adjusting the weight 56 in the usual manner. Upon the shaft is keyed an escapement wheel 13, above which is pivotally mounted an escapement lever 14, pivotally connected with the arm 11 by means of a link 15. Thus when the escapement wheel 13 is turned by the weight of the mold bar resting upon the chain the escapement will permit the wheel to turn only one cog at a time.

As best shown in Fig. 12 the mold bars are two in number, a lower mold bar 16 having a row of downwardly extending sockets or outer mold sections 17, and an upper mold bar 18 having a corresponding row of downwardly coned inner mold sections 19. The mold sections in the upper bar are arranged at corresponding intervals with the outer mold sections of the lower bar so as to register therewith. The upper bar is provided at each end with a lever handle 20 pivotally supported near its inner end in a pair of lugs 21. The lever is formed on its underside with a curved hook 22 which, when the handle is turned down, will engage the underside of a pin 23 carried by a lug 24 on the lower mold bar. When the handles are thus turned down, the upper bar will be firmly locked to the lower bar, as illustrated in Fig. 12. To facilitate the separation of the mold bars, the under bar is provided near each end with a pin 25 positioned to project upward through a hole 26 in the upper bar into the space between the lugs 21, where it will be engaged by the cam-end 27 of the lever-handle 20. When the handle is turned up, as shown in Fig. 13, the cam-end 27 will work against the end of the pin, whereby the bars will be forced away from each other.

The lower bar is provided near each end with a rounded lug 28 arranged on its rear side in position to engage and enter the open links of the alining chain 10, whereby the bar will rest upon, and be supported by, the chains, as shown in Fig. 17, and illustrated graphically in Fig. 11. The lower bar terminates at each end in a hand-grip, or handle, 29, between which and the lug 28 is rotatably mounted a grooved roller 30. When the bar is lowered by the chain through the oven 2, these rollers will be intercepted by the downwardly and forwardly inclined tracks 31 carried by the frame below the oven, and the bar will roll down these tracks onto the elevator 32, which is provided with alining tracks 33 to receive the rollers.

The elevator is vertically slidable on guides 34 upon the inner sides of the frame, and is arranged to be lifted by means of the straps or chains 35 secured at one end to the elevator and at the other end to the periphery of the pulleys or wheels 36, mounted upon shafts 37 journaled in the frame. Also secured to these shafts are smaller wheels 38 to the periphery of each of which is secured a chain or strap 39. The other ends of these chains or straps are secured to a lug 40 which is pivotally mounted upon a pin 41 carried by the foot plate 42, which slides up and down upon guides 43. When the foot plate is forced down by the operator's foot, it will pull the chains 39 and thereby turn the wheels 36 and lift the elevator 32 with the mold bar resting upon it. At the bottom of the frame is pivoted a latch 44, which automatically engages and holds the foot plate 42, when the same is thrust down, until it is released by the operator.

At the top of the frame are a pair of tracks 45 which aline with the tracks on the elevator when the same has been raised to the top of the frame. When the elevator has been thus raised, the upper mold bar with its inner mold sections is detached from the lower bar by means of the pivoted handles 20, and transferred to the bracket or plate 46, while the lower bar with its outer mold sections is pushed back on the track 45 to receive a fresh charge of dough as hereafter explained.

The cornet, when baked, tends to cling to both mold members and bind them together, but the bars can be readily forced apart by means of the pin 25 and cam 27 hereinbefore described. In order to cause all of the cornets to cling to the inner mold sections, so that they will all be lifted out with the upper bar, each of these inner sections is provided with positive means, such as the annular projection or bead 47, for anchoring the cornet to it. The dough fills in around and above the bead, and, when baked, forms a rim of pastry above it, as is clearly shown in Figs. 14 and 16. This must be trimmed and cut away before the cornet can be detached. For this purpose the frame is provided at the top with a forwardly extending bracket 46, having a series of openings arranged at intervals corresponding to those of the upper or inner mold sections 19, in each of which is arranged a cutting ring or die 48, just large enough to clear the beads 47, so that when the inner mold section with the baked cornet thereon is forced down into the ring, the pastry rim 49 will be cut off, as illustrated in Fig. 15.

The bracket or plate 46 is provided near its ends with pins 50 in position to enter the holes 26 in the upper bar, and with pins 52 carried by the ears 51 in position to be engaged by the hooks 22 upon the lever handles of the upper bar in the same manner that the pins 23 of the lower bars are engaged by it. When the upper mold bar is placed upon the bracket with the pins 50 extending up through the holes 26, each inner mold section will enter the annulus of one of the dies 48. As the lever handle 20 is turned down into the position shown in Fig. 15, the hook 20 will engage the pin 52 thereby drawing the upper bar down and forcing the pastry which has formed about the bead 47 against the annular die, by which it is clipped off below the pastry anchoring rim 49. The cornet, being thus released, will drop in upright position through the tubular guide 53 into one of the vertical pockets or compartments 54 of the removable box 55. This box rests upon a shelf 57, from which it can be removed when filled with cornets. The mold bar is then separated from the bracket by turning the handle levers 20, and replaced upon the lower bar, the outer mold sections of which have in the meantime received their charge of dough in the manner about to be described.

Secured to the frame at the top of the machine is a dough tank B, extending from side to side of the frame. The bottom of the tank is formed with a series of outlet holes 58 arranged at intervals corresponding to those of the outer mold sections of the lower mold bar. Below the dough tank is a plate 59 having near its forward edge a series of openings 60 alining with the openings in the dough tank. Between the plate 60 and the bottom of the dough tank is a sliding valve plate 61 formed with a series of holes 62 alining with the holes 58 in the dough tank and 60 in the fixed plate, and provided with hand grips 63, whereby the plate can be moved back and forth by the operator. When the valve plate is pushed back, its holes 62 will aline with the holes in the bottom of the dough tank and receive a charge of dough. When the valve is pulled forward, its holes 62 will aline with the holes 60 of the fixed plate, and the charge of dough will drop through the holes 60 into the outer mold section below, thus charging the mold section with the requisite amount of dough to form a cornet, the size of the hole 62 in the valve plate being made of the requisite size for that purpose.

When the mold bars have been lifted to the top of the frame in the manner described, and the upper mold bar transferred to the bracket 46, the lower mold bar is moved back upon the tracks 45 until its mold sections come below the holes 60 in the fixed plate 59. The valve plate is then drawn forward, and the charge of dough drops into these outer mold sections. The upper mold bar, the mold sections of which have now been freed from the baked cornets, is then replaced upon the lower mold bar, the inner mold sections of the upper bar entering the mold sections of the lower bar, and molding the pastry into the form of a cornet. The two bars are locked together and rolled back until the lower mold bar engages, and is intercepted by, the sprocket chain 10, which will move down step by step, its descent being regulated by the pendulum above described.

In order to prevent the mold bars, when they have reached the bottom of their descent from rolling down the tracks 31 before the elevator is in position to receive them, I have provided a weighted stop lever 64, which stands by gravity normally in upraised position as shown in Fig. 4, where it will intercept and hold the mold bars. When the elevator drops by gravity, after the foot plate 42 has been released from the catch 44, it will engage the end of the stop lever 64, and turn it down into the position shown in Fig. 3, in which position it will offer no obstruction to the downward travel of the mold bar to the elevator.

In operation, when the outer mold sections are charged with dough, and the inner mold sections placed in them in the manner described, the upper bar is locked to the lower bar by means of the hook 22 and pin 23, as shown in Fig. 12. The mold bars bearing the dough-charged molds are then rolled back until the bars engage the chains 10, and the projections 28 lodge in the links thereof. The mold bars then stand directly above the oven 2 through which the chain passes down. The chain is carried down under the weight of the bars, its descent being regulated step by step by means of the pendulum and escapement mechanism above described.

By properly regulating and constructing this mechanism the time of travel of the mold bar through the oven can be regulated and determined. It will be observed that, as the burners are arranged on both sides of the oven, and up and down the same, and as the mold sections are passed down endwise (or in upright position) through the oven the heat will be applied at the sides of the cornet molds and heat them uniformly on all sides, thus insuring the even baking of the cornets; and as all of the cornets are exposed to the same heat for the same length of time they will all bake uniformly. By thus passing the molds vertically through the oven, one set after another, all of the heat is used and economized.

When the mold sections have passed down through the oven, the mold bars will roll off the chain onto the elevator as above described. The operator, by manipulating the foot plate, then causes the elevator to lift the mold bars to the top of the frame. The upper mold bar is then detached from the lower bar, as described, and transferred to the plate 46 provided with the cutting rings 48, while the lower mold bar is pushed back upon the tracks 45 to receive a fresh charge of dough. While the lower mold sections are being charged, the upper mold sections are forced against the cutting dies 48, as described. The anchorage for the pastry cornets being thus cut away, the cornets will drop bottom down into the compartments 54, one upon the other so that they will form a nest as illustrated in Fig. 3.

It is obvious that various modifications can be made in the details of the construction without departing from the principle of the invention, the scope of which is defined in the claims.

I claim as my invention:

1. The combination, with an upright oven heated upon opposite sides, of cornet molds and means for passing the same endwise through the oven between the heated sides thereof, whereby the heat will be applied at the sides of the molds.

2. The combination, with an upright oven, of mutually independent burners arranged at different heights along its sidewalls, and means for passing cornet molds endwise through the oven between the opposite burners, whereby the heat will be applied at the sides of the molds.

3. The combination, with an upright oven open at top and bottom and heated on opposite sides, of a mold carrier passing vertically through the oven, a mold bar having means for engaging the carrier, and a pendulum operatively connected with the carrier for regulating the speed of its movement.

4. The combination, with an outer mold section, of a coöperating inner mold section formed with positive means for causing a cornet, when baked, to be anchored to it.

5. The combination, with an outer mold section, of a coöperating inner mold section formed on the outside with a projection for holding a cornet to it.

6. The combination, with an outer mold section, of a coöperating inner mold section formed with an annular projection for anchoring the baked cornet to it.

7. The combination, with a lower mold bar having a plurality of interspaced outer mold sections, of an upper mold bar having a plurality of coöperating inner mold sections, one of said bars having a locking pin, and the other bar having a hooked lever in position to engage and interlock with said pin.

8. The combination, with a lower mold bar having a plurality of interspaced outer mold sections, of an upper mold bar having a plurality of coöperating inner mold sections, a lever pivotally mounted upon the upper bar and having a cam face at its inner end, and a pin carried by the lower bar and extending up into the path of the cam.

9. The combination, with a lower mold bar having a plurality of outer mold sections, of an upper mold bar having a plurality of inner mold sections fitting within the mold sections of the upper bar, the upper bar being formed with a hole and the lower bar having a pin extending up through the hole, and a lever pivotally supported upon upper bar and having at its inner end a cam face in position to engage the pin when the lever is turned.

10. The combination, with an inner mold section formed on the outside with a projection for holding a cornet to it, of a die adapted to receive the inner mold section and having cutting coöperation with said projection, when the mold section is forced into it.

11. The combination, with a mold bar having a plurality of inner mold sections, each section being formed on the outside with an annular projection for anchoring a cornet to it, of a plate having a plurality of annular dies arranged at intervals corresponding to the intervals between the inner mold sections, each die being of such diameter as to have cutting coöperation with the projection of the mold section fitting within it, when the inner mold section is forced into it.

12. The combination, with a mold bar carrying a plurality of inner mold sections, each section being formed upon the outside with a projection for holding a cornet to it, of a plate having a plurality of dies corresponding in position to said mold sections and having cutting coöperation with the projections thereon, said plate having an upright abutment pin and a transverse locking pin, and a handle pivotally connected with the mold bar and provided both with a cam face in position to engage the upright pin for separating the bar from the plate, and with a hook in position to engage the transverse pin for holding the bar down upon the plate.

13. In a cornet machine, in combination, a lower mold bar, an upper mold bar seating upon the lower bar and bodily removable therefrom, the upper bar having at each end a lifting handle and also a locking device engageable with the lower bar.

14. Apparatus of the class described comprising a dough tank, a valve device having spaced openings in position to receive dough from the dough tank and discharge it in measured quantities, a vertical oven, a runway extending past the valve outlets to the top of the oven, a pair of mold bars arranged to travel on said runways, coöperating mold sections carried by said bars at intervals corresponding with the valve outlets, means for regulating the downward passage of the bars through the oven, an elevator arranged near the bottom of the oven, a runway for the mold bars extending from the oven to the elevator, and means for raising the elevator from the lower runway to the upper runway.

15. The combination, with a lower mold bar having a plurality of spaced outer mold sections, of an upper mold bar having a plurality of correspondingly spaced inner mold sections, the inner mold sections being formed with anchoring projections for the cornets, a die plate having a plurality of dies spaced apart to correspond with the mold sections, the lower mold bar and the die plate having correspondingly placed locking members, and a lever pivotally connected with the upper bar and formed with a locking member in position to engage the locking members upon the die plate and the lower bar, whereby the upper bar can be forced down upon either the die plate or the lower bar.

16. The combination, with a lower mold bar having a plurality of spaced outer mold sections, of an upper mold bar having a plurality of correspondingly spaced inner mold sections, the inner mold sections being formed with anchoring projections for the cornets, a die plate having a plurality of dies spaced apart to correspond with the mold sections, the lower mold bar and the die plate having correspondingly placed abutment elements, and a lever pivotally connected with the upper bar and provided with a cam face in position to engage the abutment elements on the die plate and the lower bar, whereby the upper bar can be forced apart from either the die plate or the lower bar.

17. In a cornet machine, in combination, a lower mold bar, an upper mold bar removably seating upon the lower bar and having at each end a lifting handle, and coöperating locking means upon said bars.

In testimony whereof I affix my signature in presence of two witnesses.

SIMEON F. PIERCE.

Witnesses:
H. SMITH,
ARTHUR P. LOTHROP.

---

Copies of this patent may be obtained for five cents each, by addressing the "Commissioner of Patents, Washington, D. C."